United States Patent
Jain et al.

(10) Patent No.: US 12,166,629 B2
(45) Date of Patent: Dec. 10, 2024

(54) MACHINE LEARNING BASED FIRMWARE VERSION RECOMMENDER

(71) Applicant: HEWLETT PACKARD ENTERPRISE DEVELOPMENT LP, Houston, TX (US)

(72) Inventors: Sargam Jain, Houston, TX (US); Charles Hogg, Santa Clara, CA (US); David Fehling, Jr., Houston, TX (US); Bernd Bandemer, Santa Clara, CA (US); Jose Tellado, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 58 days.

(21) Appl. No.: 17/949,106

(22) Filed: Sep. 20, 2022

(65) Prior Publication Data
US 2024/0095012 A1 Mar. 21, 2024

(51) Int. Cl.
*G06F 8/65* (2018.01)
*H04L 41/082* (2022.01)
(Continued)

(52) U.S. Cl.
CPC .............. *H04L 41/082* (2013.01); *G06F 8/65* (2013.01); *H04L 41/16* (2013.01); *G06F 11/008* (2013.01);
(Continued)

(58) Field of Classification Search
CPC ...... G06F 8/65; G06F 11/3409; G06F 11/008; H04L 41/082; H04L 41/16; H04L 41/0631; G06N 20/10
See application file for complete search history.

(56) References Cited

U.S. PATENT DOCUMENTS 9,383,989 B1   7/2016   Qi et al.
10,289,954 B2   5/2019   Li et al.
(Continued)

FOREIGN PATENT DOCUMENTS

WO   2020/168194 A1   8/2020

OTHER PUBLICATIONS

JP 6133889 (translation) May 24, 2017, 17 pgs <JP_6133889.pdf>.*

(Continued)

*Primary Examiner* — Tuan A Vu
(74) *Attorney, Agent, or Firm* — Sheppard Mullin Richter & Hampton LLP

(57) ABSTRACT

Examples of the presently disclosed technology provide automated firmware recommendation systems that inject the intelligence of machine learning into the firmware recommendation process. To accomplish this, examples train a machine learning model on troves of historical customer firmware update data on a dynamic basis (e.g., examples may train the machine learning model on weekly basis to predict accepted firmware updates made by a vendor's customers across the most recent 6 months). From this dynamic training, the machine learning model can learn to predict/recommend an optimal firmware version for a customer/network device cluster based on firmware-related features, recent customer preferences, and other customer-specific factors. Once trained, examples can deploy the machine learning model to make highly tailored firmware recommendations for individual network device clusters of individual customers taking the above described factors into account.

20 Claims, 5 Drawing Sheets

(51) Int. Cl.
*H04L 41/16* (2022.01)
*G06F 11/00* (2006.01)
*G06F 11/34* (2006.01)
*G06N 20/10* (2019.01)
*H04L 41/0631* (2022.01)

(52) U.S. Cl.
CPC .......... *G06F 11/3409* (2013.01); *G06N 20/10* (2019.01); *H04L 41/0631* (2013.01)

(56) References Cited

U.S. PATENT DOCUMENTS

| | | |
|---|---|---|
| 10,354,196 B2 | 7/2019 | Spiro et al. |
| 10,356,117 B2 | 7/2019 | Brabec et al. |
| 10,769,570 B2 | 9/2020 | Lu |
| 2019/0012746 A1 | 1/2019 | Sullivan et al. |
| 2019/0377984 A1 | 12/2019 | Ghanta et al. |
| 2020/0019886 A1 | 1/2020 | Mondero et al. |
| 2020/0042370 A1* | 2/2020 | Kao ..................... G06F 11/008 |
| 2021/0021494 A1* | 1/2021 | Yao .................... H04L 41/0631 |
| 2021/0064361 A1* | 3/2021 | Jayaraman ............. G06N 20/10 |
| 2021/0133580 A1 | 5/2021 | Mehl et al. |
| 2024/0037002 A1* | 2/2024 | Aurongzeb ......... G06F 11/3409 |

OTHER PUBLICATIONS

JP 6890522, (translation), Jun. 18, 2021, 26 pgs <JP_6890522.pdf>.*
Breiman, L., "Random Forests", Machine Learning, vol. 45, Issue 1, Oct. 2001, pp. 5-32.
Zhang, H.R., et al., "Aggregated recommendation through random forests", The Scientific World Journal, vol. 2014, Aug. 11, 2014, pp. 12.

* cited by examiner

MACHINE LEARNING BASED FIRMWARE VERSION RECOMMENDER

BACKGROUND

Firmware is a type software that is embedded in a piece of hardware (e.g., network devices such as access points, switches, gateways, etc.). Firmware for a network device can be updated periodically to (1) take advantage of new/improved features (e.g., enhanced security features, new/improved functionalities, fewer bugs, etc.) of new firmware versions for the network device; and (2) ensure that the network device remains compatible with other network devices that utilize the new firmware versions. For this reason, vendors generally prefer that customers run the newest, stable firmware versions on their network devices. Firmware upgrades can be made available to customers automatically via vendor-specific network management systems (as used herein, a network management system may refer to a computerized system that automates aspects of network management/administration—HPE's Aruba Central is an example of a network management system that is a unified cloud-based network operations and security platform).

When deployed, network devices often operate together as a group/cluster within a common network (as used herein, a "network device cluster" may refer to a group/cluster of network devices of the same type—e.g., access points may be a first type of network device, switches may be a second type of network device, gateways may be a third type of network device, etc.—that operate together within a common network). For example, a cluster of access points deployed at a customer site may operate together to provide wireless access to users (it should be understood that the access points may be of the same network device type—i.e., access points—but may comprise different models within the network device type—e.g., a first access point model, a second access point model, etc.). In large deployments (e.g., deployments of 100 or more access points), a network device cluster may comprise different network device models with different ranges of compatible firmware (e.g., a particular firmware version may be compatible on access points of model A within network device cluster, but not compatible on access points of model B within the network device cluster). Ideally, a network device cluster will utilize the same firmware version to ensure that the networks devices within the cluster maintain interoperability/compatibility. However, interoperability/compatibility within network device clusters is not always realized due to ingrained deficiencies in the conventional firmware recommendation process.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
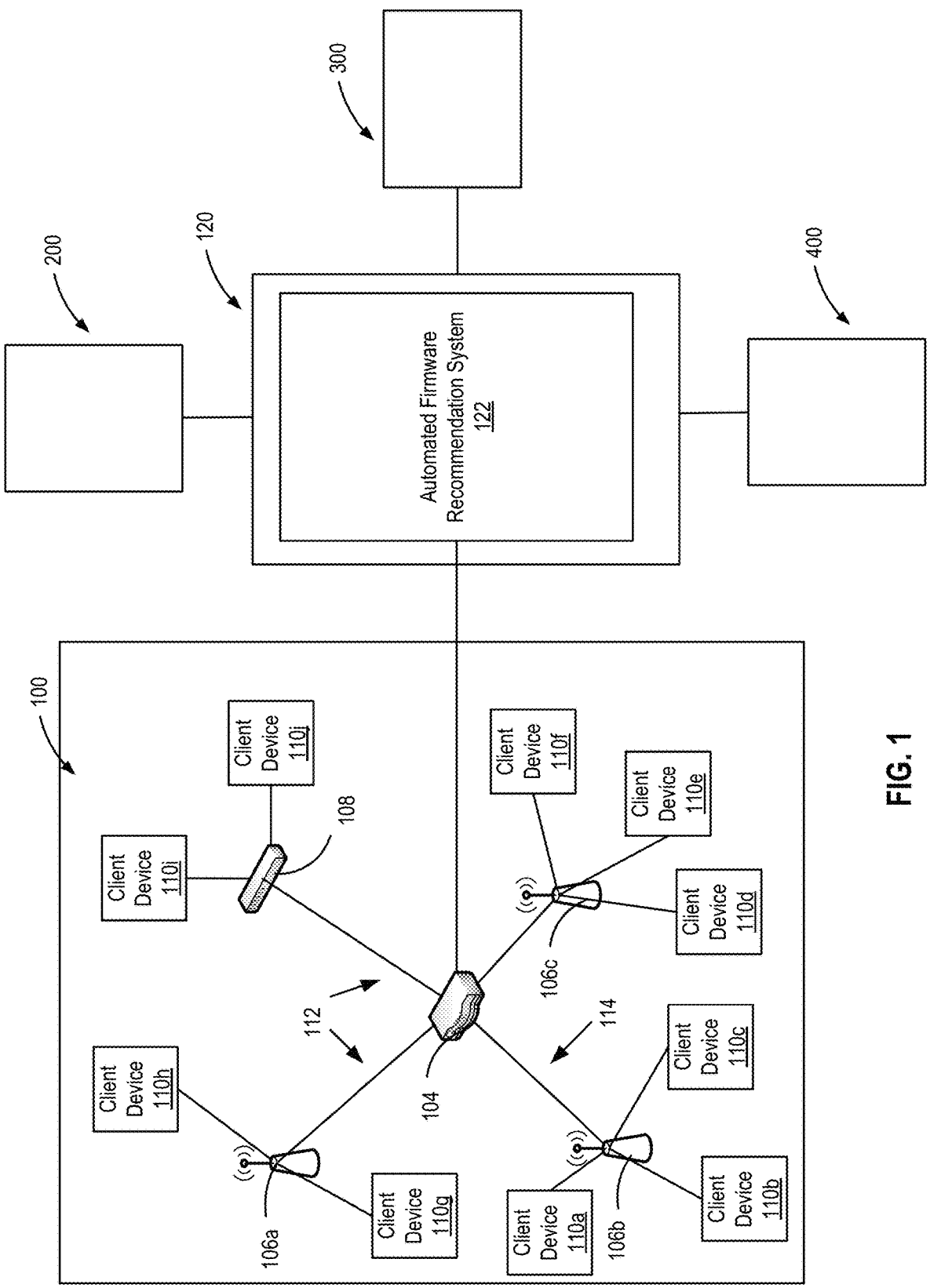
FIG. 1 depicts an example schematic representation where an automated firmware recommendation system makes a firmware version recommendation for a group of network devices, in accordance with various examples of the presently disclosed technology

The figures are not exhaustive and do not limit the present disclosure to the precise form disclosed.

DETAILED DESCRIPTION

Providing tailored firmware recommendations (e.g., firmware recommendations tailored to individual customers or individual network device clusters of individual customers) is a serious challenge. A vendor may have millions of network devices deployed in the field across thousands/tens of thousands of customer sites. These millions of network devices will have different ranges of compatible firmware versions based on type (e.g., access point vs. switch vs. gateway, etc.), model (e.g., access point model A vs. access point model B, etc.), and configuration (e.g., configuration 1 for access point model A vs. configuration 2 for access point model A, etc.). Even among like network devices (e.g., network devices of the same type/model)—an optimal firmware version for one customer may be different than an optimal firmware version for another customer based on a variety of customer-specific factors (e.g., (a) size and number of customer sites; (b) customer-specific deployment configurations; (c) customer-specific network device configurations (c) customer-specific vulnerability concerns; (d) customer-specific bugs; etc.).

Compounding this challenge—and as alluded to above—optimal firmware version recommendation often requires ensuring that groups of network devices that operate together (i.e., network device clusters) run on the same firmware version. This aspect of the firmware recommendation problem can be especially challenging in large customer deployments (e.g., customer deployments of 100 or more access points), where a network device cluster may comprise different network device models with different ranges of compatible firmware (e.g., a particular firmware version may be compatible on access points of model A within the cluster, but not compatible on access points of model B within the cluster).

The conventional process for recommending firmware versions is wholly ill-equipped to address the challenges described above. Currently, the process involves product managers and engineering teams engaging in back-and-forth discussions about what firmware version updates should be recommended for a vendor's various types and models of network devices. After a cross-organizational consensus has been reached, agreed-upon firmware versions are typically passed through internal testing processes. After internal testing, the recommendations are eventually provided to customers.

Due to this manual, time-consuming process that often requires cross-organizational correspondence/consensus among various product managers and engineering teams, firmware version update/upgrade recommendations can be infrequent (e.g., once every 2-3 months), and slow to react to new firmware version releases. Delays between firmware version releases and recommendations create a lost opportunity for customers to take immediate (or close to immediate) advantage of new/improved features of newly released firmware versions. These delays can also reduce/limit performance for a vendor's network management system (e.g., HPE's Aruba Central) which may rely on customer network devices being updated with the latest firmware version in order to provide optimal services.

Another problem with the human-driven recommendation process described above is that it is largely unable to provide tailored recommendations (e.g., recommendations tailored to individual customers or recommendations tailored to individual network device clusters of individual customers). As described above, a vendor may have thousands/tens of thousands of different customers, and each customer may have multiple sites/networks. With such a vast customer base, it is difficult, expensive, and inefficient for a vendor's engineering and product management teams to have customer-specific (or network device cluster-specific) discussions for firmware recommendation. Accordingly, blanket (i.e., non-customer specific) recommendations are often provided that may be sub-optimal for various customers/customer sites.

For example, the above-described blanket recommendations may produce 'incompatible' firmware versions for network device clusters. This is because a recommended firmware version may only be compatible on certain network devices within a network device cluster. Accordingly, if a customer follows the recommendation, certain of their network devices may be installed with incompatible firmware. Alternatively, a customer may follow the recommendation for a subset of network devices within the cluster for which the recommended firmware version is compatible, resulting in network devices of the cluster having different firmware versions. Either of these scenarios is sub-optimal for network operation/health, and can lead to: (a) a poor customer/user experience, (b) high troubleshooting costs incurred by a vendor; (c) and reduced performance for a vendor's network management system that relies on customer network devices running on compatible firmware version in order to provide optimal services. For example, incompatible firmware-network devices (i.e., network devices with incompatible firmware versions installed on them) can cause disruptions in a network management system's ability to collect network telemetry data—which can impede the network management system from providing dynamic data driven insights to customers.

Due to a bad user experience in updating firmware versions, customers can be discouraged from upgrading to new firmware versions made available to them. This can result in a higher number of firmware versions running on network devices of a vendor than desirable (e.g., customers may be running upwards of 50 firmware versions on a vendor's access points when ideally customers should be running the latest 10 firmware versions compatible across the different hardware models of the vendor's access points). Consequently, the vendor's technical support centers can become unduly burdened with issues related to firmware upgrades. As alluded to above, incompatible firmware-network devices can also reduce performance for a vendor's network management system that interacts with/manages the incompatible firmware-network devices. For example, incompatible firmware-network devices can disrupt a vendor's network management system from collecting network telemetry data—which can impede the vendor's network management system from providing dynamic data driven insights to customers.

Against this backdrop, examples of the presently disclosed technology provide automated firmware recommendation systems that inject the intelligence of machine learning into the firmware recommendation process. To accomplish this, examples train a machine learning model on troves of historical customer firmware update data on a dynamic basis (e.g., examples may train the machine learning model on weekly basis to predict accepted firmware updates made by a vendor's customers across the most recent 6 months). From this dynamic training, the machine learning model can learn to predict/recommend an optimal firmware version for a customer/network device cluster based on firmware-related features, recent customer preferences, and other customer-specific factors. Once trained, examples can deploy the machine learning model to make highly tailored firmware recommendations for individual network device clusters of individual customers taking the above described factors into account. In certain examples, the automated firmware recommendation systems can be incorporated into a vendor's network management system (e.g., HPE's Aruba Central). Accordingly, examples can improve functionality for a vendor's network management system while also improving its performance (as alluded to above, by reducing the number of incompatible-firmware network devices that the network management system interacts with, examples can improve performance of the network management system).

Moreover (and as alluded to above), examples can also ensure that all network devices within a network device cluster are compatible with a recommended firmware version. Accordingly, examples can reduce the number of incompatible-firmware network devices in the field—thereby improving customer/user experience, reducing vendor-support costs, improving performance for a vendor's network management system, etc.

In various examples, examples can use the machine learning model to compute a plurality of firmware update likelihood scores for each network device of a network device cluster based on: (1) features of the "pre-update" firmware versions currently installed on the network devices of the network device cluster (e.g., a number of bugs raised by customers—weighted by severity of bugs—for the pre-update firmware versions, a number of internal bugs—weighted by severity of bugs—for the pre-update firmware versions, age of the pre-update firmware versions, numerical values measuring a level of popularity for the pre-update firmware versions, numerical values measuring a level of security for the pre-update firmware versions, etc.); (2) features of all the available/prospective "update" firmware versions compatible on network devices of the network device cluster (e.g., a number of bugs raised by customers—weighted by severity of bugs—for the update firmware versions, a number of internal bugs—weighted by severity of bugs—for the update firmware versions, age of the update firmware versions, numerical values measuring a level of popularity for update firmware versions, numerical values measuring a level of security for the update firmware versions, a numerical value measuring a level of operational performance for the update firmware versions, etc.); and (3) various customer/customer site specific-factors (e.g., (a) size and number of customer sites; (b) customer-specific deployment configurations; (c) customer-specific network device configurations (d) customer-specific vulnerability concerns; (e) customer-specific bugs; etc.). For a first network device:

(1) a first firmware update likelihood score may comprise a numerical score quantifying a likelihood that the first network device will update from its pre-update firmware version to a first update firmware version, the first update firmware version being compatible with the first network device; and (2) the plurality of firmware update likelihood scores may comprise firmware update likelihood scores associated with all available/prospective update firmware versions compatible on the first network device. Examples may then compute, for each firmware version available to network devices of the network device cluster, an aggregate firmware update likelihood score across network device cluster. Examples can then recommend, to at least one of the network devices of the network device cluster, an update to the available update firmware version having the highest aggregate firmware update likelihood score among available update firmware versions compatible on all the network devices of the network device cluster.

Examples of the presently disclosed technology provide numerous advantages over the current manual, human-driven firmware recommendation process. As a first example, examples can provide tailored recommendations for individual network device clusters of individual customers. Lacking artificial intelligence/automation, such tailored recommendations are generally not achievable for the current manual process. As a second (and related) example, examples can ensure that all network devices within a network device cluster are compatible with a recommended firmware version. As described above, recommending incompatible firmware versions for a customer's network device cluster is a common failure of the blanket recommendations produced by the current firmware recommendation process. As a third example, examples can provide recommendations more quickly than the current firmware recommendation process. For instance, examples can leverage the automation/intelligence of machine learning to dynamically make recommendations in immediate response to new firmware version releases—which in various examples can be released by a network management system orchestrating the firmware update recommendations. Based on all of the advantages described above, examples of the presently disclosed technology can reduce the number of incompatible-firmware network devices in the field—thereby improving customer/user experience, reducing vendor-support costs, improving performance for a vendor's network management system, etc.

Before describing examples of the presently disclosed technology in greater detail, it should be understood that the automated firmware recommendation systems of the presently disclosed technology do not simply recommend the "latest" firmware version compatible on an individual network device. Instead, the automated firmware recommendation systems of the presently disclosed technology make network device cluster-specific recommendations based on multiple customer-/site-specific factors considered together (informed by training on troves of historical customer data) in addition to the various firmware version features described above. In certain cases, this may result in a recommendation of a firmware version for a network device cluster that is notthe latest firmware version compatible on all the network devices of the network device cluster. Relatedly, this can also result in a recommendation of a firmware version for the network device cluster that is not the optimal/"best" firmware version for certain of the network devices of the network device cluster—but that is optimal for the network device cluster as a whole—taking into account customer and customer-site specific factors.

FIG. 1 depicts an example schematic representation where an automated firmware recommendation system 122 makes a firmware version recommendation for a group of network devices 106a-c of a customer network deployment 100, in accordance with various examples of the presently disclosed technology. Automated firmware recommendation system 122 may be incorporated into a computerized network management system 120 (e.g. HPE's Aruba Central) that manages a wide array of network deployments including network deployment 100 (of which the group of network devices 106a-c are apart). In other words, it should be understood that automated firmware recommendation system 122 is a multi-tenant solution that takes advantage of data from many customers/customer deployments (e.g., customer deployments 200, 300, 400, and any number of additional customer deployments—which are not depicted in full detail in example FIG. 1 for brevity).

Network deployment 100 may include a primary network, which can be, for example, an office network, home network or other network installation. The network deployment 100 network may be a private network, such as a network that may include security and access controls to restrict access to authorized users of the private network. Authorized users may include, for example, employees of a company, residents of a house, customers at a business, and so on.

In the illustrated example, network deployment 100 includes a controller 104 in communication with automated firmware recommendation system 122. Controller 104 may provide communication with automated firmware recommendation system 122 for network deployment 100, though it may not be the only point of communication with automated firmware recommendation system 122 for network deployment 100. A single controller 104 is illustrated, though network deployment 100 may include multiple controllers and/or multiple communication points with automated firmware recommendation system 122. In certain examples (e.g., where automated firmware recommendation system 122 is a cloud-based deployment), controller 104 communicates with automated firmware recommendation system 122 through the internet (not illustrated). In these examples automated firmware recommendation system 122 may communicate/connect with the internet directly (where controller 104 provides router functionality) or through a router (not illustrated). In certain examples, controller 104 may communicate with automated firmware recommendation system 122 directly or through the router (not illustrated). As alluded to above, and as will be described in greater detail below, automated firmware recommendation system 122 can provide, to controller 104, firmware recommendations for network devices of network deployment 100 (e.g., wireless APs 106a-c).

Controller 104 may be operable to configure and manage network devices, such as those of network deployment 100. Controller 104 may be operable to configure and/or manage switches, routers, access points, and/or client devices connected to a network. Controller 104 may itself be, or provide the functionality of, an access point.

Controller 104 may be in communication with one or more switches 108 and/or wireless Access Points (APs) 106a-c. Switches 108 and wireless APs 106a-c provide network connectivity to various client devices 110a-j. Using a connection to a switch 108 or wireless AP 106a-c, a client device 110a-j may access network resources, including other devices of network deployment 100, and automated firmware recommendation system 122.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within network deployment 100, a switch 108 is included as one example of a point of access to the network established in network deployment 100 for wired client devices 110$i$-$j$. Client devices 110$i$-$j$ may connect to switch 108 and through switch 108, may be able to access other devices within network deployment 100. The client devices 110$i$-$j$ may communicate with switch 108 over a wired 112 connection. In the illustrated example, switch 108 communicates with controller 104 over a wired 112 connection, though this connection may also be wireless.

Wireless APs 106$a$-$c$ are included as another example of a point of access to the network established by network deployment 100 for client devices 110$a$-$h$. Each of wireless APs 106$a$-$c$ may be a combination of hardware, software, and/or firmware that is configured to provide wireless network connectivity to wireless client devices 110$a$-$h$. In the illustrated example, wireless APs 106$a$-$c$ can be managed and configured by controller 104. Wireless APs 106$a$-$c$ communicate with controller 104 and the network over connections 112, which may be either wired or wireless interfaces.

As described above, wireless APs 106$a$-$c$ may comprise a network device cluster. A network device cluster may refer to a group/cluster of network devices of the same type (e.g., access points, switches, gateways, etc.) that operate together within a common network. While wireless APs 106$a$-$c$ may have a common vendor, they may be different models, with different sets of compatible firmware versions available to them. As alluded to above, the cluster of wireless APs 106$a$-$c$ should utilize the same firmware version in order to maintain optimal interoperability/compatibility. Unfortunately, a problem with the conventional manual firmware version recommendation process is that it frequently recommends 'incompatible' firmware versions for network device clusters. For example, the process may recommend a firmware version that is only compatible on wireless APs 106$a$ and 106$b$. Accordingly, if a customer follows the recommendation, wireless AP 106$c$ may be installed with incompatible firmware. Alternatively, a customer may follow the recommendation for wireless APs 106$a$ and 106$b$, resulting in wireless APs 106$a$ and 106$b$ having a different firmware version than wireless APs 106$c$. Either of these scenarios is sub-optimal for network operation/health, and can lead to: (a) a poor customer/user experience; (b) high troubleshooting costs incurred by a vendor; (c) and reduced performance for a vendor's network management system that relies on customer network devices running on compatible (and/or the latest) firmware versions in order to provide optimal services. As alluded to above, and as will be described below, examples can improve upon the current firmware recommendation process by making network device cluster-specific recommendations that ensure that a recommended firmware version is compatible on all network devices of the network device cluster.

Figure 2:
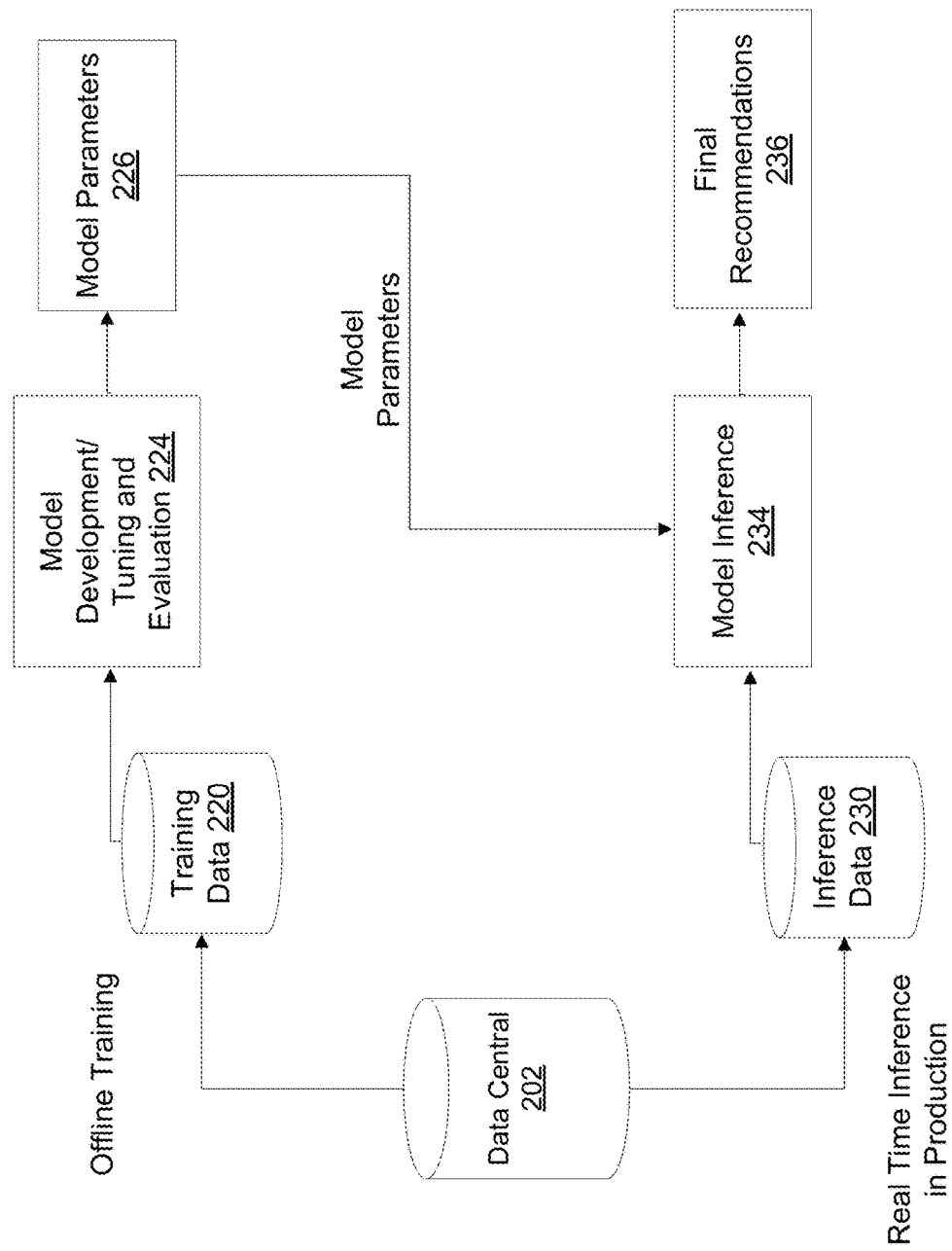
FIG. 2 illustrates an example workflow that can be used to: (1) train a machine learning model to predict firmware versions updates; and (2) deploy the machine learning model at inference to automatically recommend a compatible firmware version for a group of network devices, in accordance with various examples of the presently disclosed technology

FIG. 2 illustrates an example workflow 200 that can be used to: (1) train a machine learning model to predict firmware versions updates; and (2) deploy a machine learning model at inference to automatically recommend a compatible firmware version for a group of network devices, in accordance with various examples of the presently disclosed technology. As depicted, the top portion of workflow 200 includes a workflow that can be used for offline training, and the bottom portion of workflow 200 includes a workflow that can be used for real time predictions/inference.

Offline Training

Training data 220 may be used to train a machine learning model to predict firmware versions updates. In various examples, training data 220 can be extracted from data central 202, which may be a repository of network-related data. In various examples, the data stored in data central 202 may be acquired (and/or stored) by a computerized network management system (e.g., HPE's Aruba Central).

Training data 220 may comprise a set of historical firmware update data. The set of historical firmware update data may comprise data related to a plurality of historical firmware updates made on a plurality of network devices of customers.

In various examples, the set of historical firmware update data may be vendor-specific and network device type-specific. For example, the set of historical firmware update data may comprise data related to all (or some subset) of the firmware updates made by customers on a vendor's access points in the last 6 months. In certain examples, the historical firmware update data may be vendor-specific, but include data related to updates made on a variety of network device types (e.g., data related to updates made on access points, switches, and gateways). Here it should be understood that the firmware version updates may be upgrades (i.e., updates from a pre-update firmware version to a newer/later firmware version) and downgrades (i.e., updates from a pre-update firmware version to an older firmware version).

Within the set of historical firmware update data, an individual historical firmware update data may relate to an individual firmware update made by a customer on a network device. The individual historical firmware update data may include information related to the pre-update firmware version (i.e., the firmware version installed on the network device prior to the update) and information related to the post-update firmware version (the firmware version the network device was updated to). Such information may include features of the pre-update firmware version and features of the post-update firmware version such as: a number of bugs (as used herein a "bug" may refer to an error, such as a coding error, for a firmware version) raised by customers—weighted by severity of bugs—for the firmware versions; a number of internal bugs—weighted by severity of bugs—for the firmware versions; age of the firmware versions, numerical values measuring a level of popularity for the firmware versions; numerical values measuring a level of security for the firmware versions; a numerical value measuring a level of operational performance for the firmware versions (e.g., SLA, device times, crashes, speed, etc.); etc. The individual historical firmware update data may also include similar information related to all of the firmware versions that were available to, and compatible with, the network device at the time of the historical firmware update. From this information, the machine learning model can learn to predict firmware updates given a wide array of choices. In various examples, the individual historical firmware update data may also include customer/network device specific information such as: (a) size of the customer site the network device was deployed in; (b) customer-specific deployment configurations; (c) customer-specific network device configurations; (c) customer-specific vulnerability concerns; (d) customer-specific bugs; etc.). From this information the machine learning model can learn to take customer-specific factors into account when predicting firmware updates. In certain examples, all of the above described information may be contemporaneous with a historical firmware update (e.g., a numerical value measuring a level of popularity for available firmware versions at the time of the historical firmware update, customer-specific network device configurations at the time of the historical firmware update, etc.).

During model development/tuning and evaluation 224, examples train the machine learning model to predict firmware versions updates using the training data 220. Such training will be described in greater detail in conjunction with FIG. 3.

The machine learning model (which may be various types of machine learning models including classification-based machine learning models such as a random forest model, a k-means clustering model, etc.) may update its model parameters 226 in accordance with its training. Accordingly, updated model parameters 226 may be used for the machine learning model deployed at inference. Model parameters 226 may be updated on a dynamic basis (e.g., once a week, once a day, etc.).

Real Time Inference in Production

Inference data 230 may be used by the machine learning model deployed at inference to automatically recommend a compatible firmware version for a group of network devices. In various examples, inference data 230 can be extracted from data central 202, which may be a repository of network-related data. In various examples, the data stored in data central 202 may be acquired (and/or stored) by a network management system (e.g., HPE's Aruba Central).

Inference data 230 may comprise network-related information for a plurality of network devices. In various examples, inference data 230 may be vendor-specific and network device type-specific. For example, inference data 230 may comprise data related to all (or some subset) of a vendor's access points. In certain examples, inference data 230 may be vendor-specific, but include data related a variety of network device types (e.g., access points, switches, and gateways).

Inference data 230 may include firmware-related information for the plurality of network devices. For example, for a network device of the plurality of network devices, the firmware-related information may include: (1) the firmware version currently installed on the network device; (2) features of the firmware version currently installed on the network device; (3) a list of all the firmware versions compatible with the network device (this may include firmware versions that would constitute an upgrade or a downgrade); (4) features of all the firmware versions compatible with the network device; etc.

Inference data 230 may also include customer/network device-specific information that the machine learning model may use to recommend an optimal/improved firmware version. For example, for a network device of the plurality of network devices such information may include: (a) size of the customer site the network device is deployed in; (b) customer-specific deployment configurations; (c) customer-specific network device configurations; (c) customer-specific vulnerability concerns; (d) customer-specific bugs; etc.

As alluded to above, the machine learning model may use inference data 230 to recommend an optimal/improved firmware version for group of network devices. In some cases, the group of network devices may comprise a network device cluster. As described above, a network device cluster may be a group/cluster of network devices of the same type (e.g., access points, switches, gateways, etc.) that operate together within a common network. For example, a network device cluster may comprise a cluster of access points that work together to provide wireless access to users at a customer location. While these access points may have a common vendor, they may be different models, with different sets of compatible firmware versions available to them. The network device cluster should utilize the same firmware version in order to maintain optimal interoperability/compatibility. As alluded to above, and as will be described below, examples can improve upon the current firmware recommendation process by making network device cluster-specific recommendations that ensure that a recommended firmware version is compatible on all network devices of the network device cluster.

Accordingly, inference data 230 may also include information related to network device clusters that enable the machine learning model to determine which firmware versions are available to, and compatible with, each network device within a network device cluster.

During model inference 234, the machine learning model deployed at inference recommends optimal/improved firmware versions for groups of network devices using the inference data 230. Such recommendations will be described in greater detail in conjunction with FIG. 4. As alluded to above, the model parameters 226 of the machine learning model deployed at inference may be updated dynamically based on training (e.g., once a week, once a day, etc.).

Figure 3:
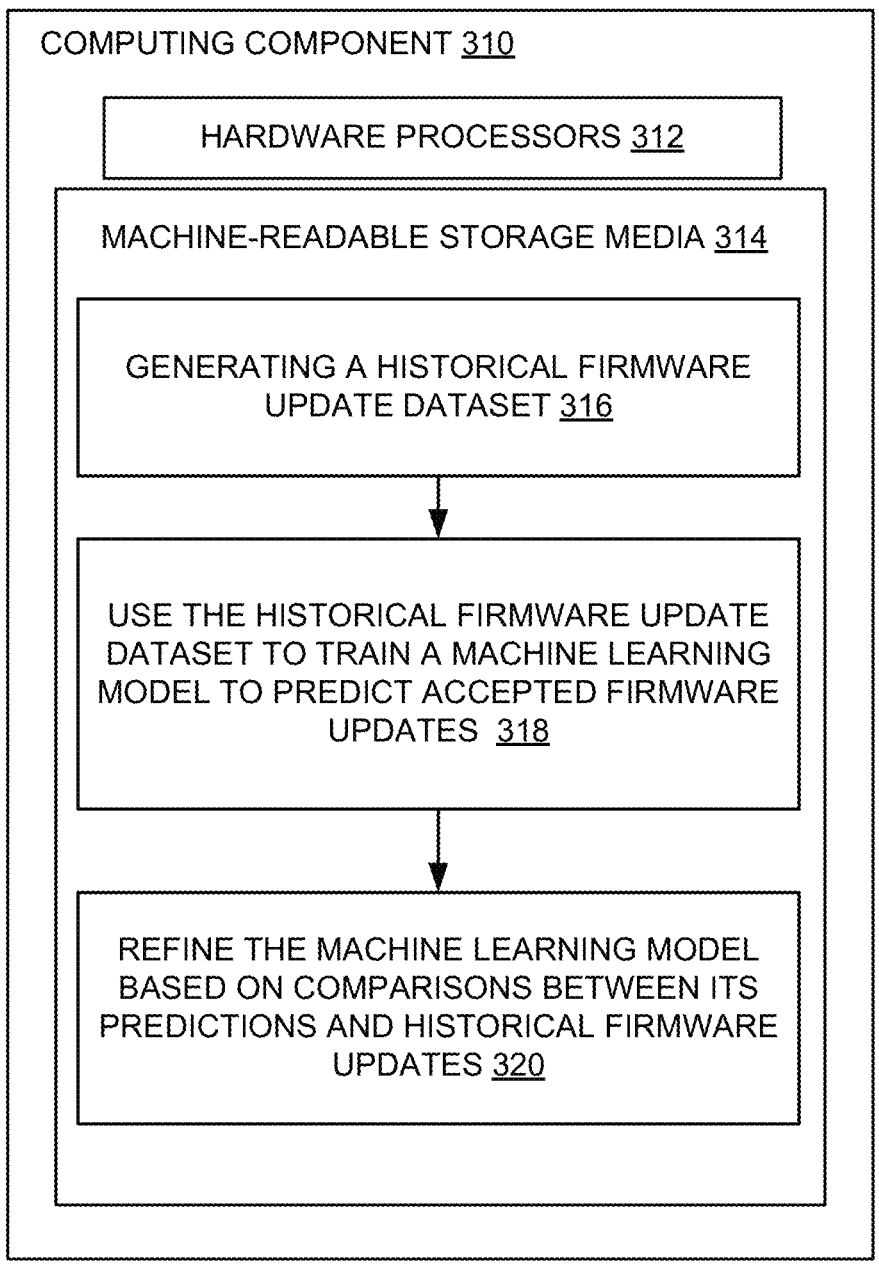
FIG. 3 depicts an example computing system that may be used to train a machine learning model to predict accepted firmware versions updates, in accordance with various examples of the presently disclosed technology.

FIG. 3 depicts an example computing system 300 that may be used to train a machine learning model to predict accepted firmware versions updates, in accordance with various examples of the presently disclosed technology. In certain examples, computing system 300 may be incorporated into a vendor's network management system (e.g., HPE's Aruba Central).

Referring now to FIG. 3, computing component 310 may be, for example, a server computer, a controller, or any other similar computing component capable of processing data. In the example implementation of FIG. 3, the computing component 310 includes a hardware processor 312, and machine-readable storage medium for 314.

Hardware processor 312 may be one or more central processing units (CPUs), semiconductor-based microprocessors, and/or other hardware devices suitable for retrieval and execution of instructions stored in machine-readable storage medium 314. Hardware processor 312 may fetch, decode, and execute instructions, such as instructions 316-320, to control processes or operations for burst preloading for available bandwidth estimation. As an alternative or in addition to retrieving and executing instructions, hardware processor 312 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 314, may be any electronic, magnetic, optical, or other physical storage device that contains or stores executable instructions. Thus, machine-readable storage medium 314 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 314 may be a non-transitory storage medium, where the term "non-transitory" does not encompass transitory propagating indicators. As described in detail below, machine-readable storage medium 314 may be encoded with executable instructions, for example, instructions 316-320.

As described above, computing system 300 may be used to train a machine learning model to predict firmware versions updates. The machine learning model may be various types of machine learning models, such as a random forest model.

Hardware processor 312 may execute instruction 316 generate a historical firmware update dataset. The historical firmware update dataset may comprise data related to historical firmware updates made on network devices of customers.

In various examples, the historical firmware update dataset may be vendor-specific and network device type-specific. For example, the historical firmware update dataset may comprise data related to all (or some subset) of the firmware updates made by customers on a vendor's access points in the last 6 months. In certain examples, the historical firmware update dataset may be vendor-specific, but include data related to updates made on a variety of network device types (e.g., data related to updates made on access points, switches, and gateways). Here it should be understood that the firmware version updates may be upgrades (i.e., updates from a pre-update firmware version to a newer/later firmware version) and downgrades (i.e., updates from a pre-update firmware version to an older firmware version).

Within the historical firmware update dataset, an individual historical firmware update data may relate to an individual firmware update made by a customer on a network device. The individual historical firmware update data may include information related to the pre-update firmware version (i.e., the firmware version installed on the network device prior to the update) and information related to the post-update firmware version (the firmware version that was updated to). Such information may include features of the pre-update firmware version and features of the post-update firmware version such as: a number of bugs raised by customers—weighted by severity of bugs—for the firmware versions; a number of internal bugs—weighted by severity of bugs—for the firmware versions; age of the firmware versions; numerical values measuring a level of popularity for the firmware versions; numerical values measuring a level of security for the firmware versions; a numerical value measuring a level of operational performance for the firmware versions; etc. The individual historical firmware update data may also include similar information related to all of the firmware versions that were available to, and compatible with, the network device at the time of the historical firmware update. From this information, the machine learning model can learn to predict firmware updates given a wide array of choices. In various examples, the individual historical firmware update data may also include customer/network device specific information such as: (a) size of the customer site the network device was deployed in; (b) customer-specific deployment configurations; (c) customer-specific network device configurations; (c) customer-specific vulnerability concerns; (d) customer-specific bugs; (e) opmodes of customer network device SSIDs including whether they are open or protected; (f) customer site-specific network device mix; (g) customer preferences for type of SSIDs configured (e.g., guest vs. employee vs. voice); (h) what bands customer network devices are configured for (e.g., 2.4 GHz, 5 GHz, 6 GHz, or any combination of the three); (i) what protocols a customer has chosen to run on their network; (j) customer-specific upgrade behavior including a risk preference; (k) customer-specific applications served by customer network devices; etc. From this information the machine learning model can learn to take customer-specific factors into account when predicting firmware updates. In certain examples, all of the above described information may be contemporaneous with a historical firmware update (e.g., a numerical value measuring a level of popularity for available firmware versions at the time of the historical firmware update, customer-specific network device configurations at the time of the historical firmware update, etc.).

In various examples, the historical firmware update dataset may be generated by a vendor's computerized network management system (e.g., HPE's Aruba Central).

Hardware processor 312 may execute instruction 318 to use the historical firmware update dataset to train the machine learning model to predict accepted firmware updates based on computed firmware update likelihood scores for the historical firmware updates. In various examples, hardware processor 312 may train the machine learning model to predict accepted firmware version updates for all of the historical firmware updates made on the network devices based on computed firmware update likelihood scores.

Here, the predicted accepted firmware version for the historical firmware update may be the contemporaneously available prospective update firmware version with the highest computed firmware update likelihood score for the historical firmware update.

The machine learning model may compute firmware update likelihood scores for a historical firmware update made on a network device based on features of a pre-update firmware version installed on the network device and features of one or more (and in some cases all) contemporaneously available update firmware versions compatible on the network device. Here, a first contemporaneously available update firmware version may be a first firmware version (different than the pre-update firmware version for the network device) that was available to, and compatible with, the network device contemporaneous with the historical firmware update. A first firmware update likelihood score may comprise a numerical score quantifying a likelihood that the network device would update from the pre-update firmware version installed on the network device to the first contemporaneously available update firmware version (e.g., a probability that the network device would update from the pre-update firmware version to the first contemporaneously available update firmware version). The firmware update likelihood scores for the historical firmware update made on a network device may comprise firmware update likelihood scores associated with all update firmware versions that were available to, and compatible with, the network device contemporaneous with the historical firmware update (including the first firmware update likelihood score associated with the first contemporaneously available update firmware version).

As alluded to above, the features of the pre-update firmware version installed on the network device may comprise: (1) a number of bugs raised by customers, weighted by severity of bugs, for the pre-update firmware version at the time of the historical firmware update; (2) a number of internal bugs, weighted by severity of bugs, for the pre-update firmware version at the time of the historical firmware update; (3) age of the pre-update firmware version at the time of the historical firmware update; (4) a value measuring a level of popularity for the pre-update firmware version at the time of the historical firmware update; (5) a numerical value measuring a level of security for the pre-update firmware version at the time of the historical firmware update; (6) a numerical value measuring a level of operational performance (e.g., SLA, device uptime, crashes, speed, etc.) for the pre-update firmware version at the time of the historical firmware update; etc. Relatedly, the features of the first contemporaneously available update firmware version for the network device may comprise: (1) a number of bugs raised by customers, weighted by severity of bugs, for the first contemporaneously available update firmware version at the time of the historical firmware update; (2) a number of internal bugs, weighted by severity of bugs, for the first contemporaneously available update firmware version at the time of the historical firmware update; (3) age of the first contemporaneously available update firmware version at the time of the historical firmware update; (4) a value measuring a level of popularity for the first contemporaneously available update firmware version at the time of the historical firmware update; (5) a numerical value measuring a level of security for the first contemporaneously available update firmware version at the time of the historical firmware update; (6) a numerical value measuring a level of operational performance (e.g., SLA, device uptime, crashes, speed, etc.) for the first contemporaneously available update firmware version at the time of the historical firmware update; etc.

As alluded to above, in various examples the machine learning model may take customer-specific factors into account when making firmware update likelihood score computations such as: (a) size of the customer site the network device was deployed in; (b) customer-specific deployment configurations; (c) customer-specific network device configurations (c) customer-specific vulnerability concerns; (d) customer-specific bugs; etc.

As alluded to above, hardware processor 312 can train the machine learning model on a dynamic basis. For instance, hardware processor 312 can train the machine learning model on weekly rolling basis where the historical firmware update dataset comprises data related to all historical firmware updates made by a vendor's customers across the most recent 6 months (or more specifically, all historical firmware updates made by a vendor's customers—for a particular type of network device—made by a vendor's customers across the most recent 6 months). From this training, the machine learning model can derive dynamic insights related to contemporaneous customer preferences from recent customer behavior-related data.

Hardware processor 312 may execute instruction 320 to refine the machine learning model based on comparisons between the machine learning model's predicted accepted firmware updates and the historical firmware updates. In this way, the machine learning model can be refined to make predictions/recommendations that more closely track customer behavior/preferences. In some examples, user feedback may be used to train/refine the machine learning model.

Figure 4:
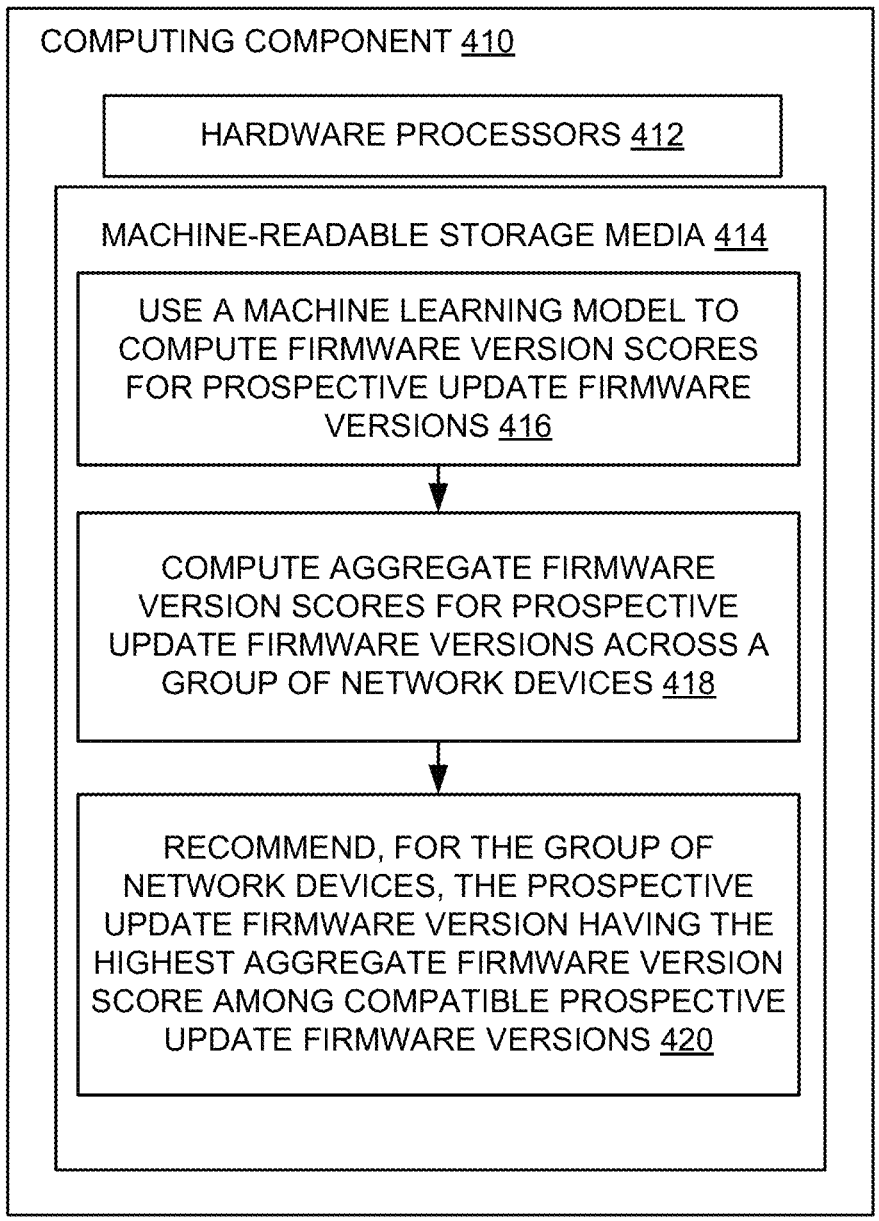
FIG. 4 depicts an example computing system that may be used to automatically recommend a compatible firmware version for a group of network devices, in accordance with various examples of the presently disclosed technology.

FIG. 4 depicts an example computing system 400 that may be used to automatically recommend a compatible firmware version for a group of network devices, in accordance with various examples of the presently disclosed technology. In certain examples, computing system 400 may be incorporated into a vendor's network management system (e.g., HPE's Aruba Central).

Referring now to FIG. 4, computing component 410 may be, for example, a server computer, a controller, or any other similar computing component capable of processing data. In the example implementation of FIG. 4, the computing component 410 includes a hardware processor 412, and machine-readable storage medium for 414.

Hardware processor 412 and machine-readable storage medium 414 may be the same/similar as hardware processor 312 and machine-readable storage medium 314 respectively. Accordingly, machine-readable storage medium 414 may be encoded with executable instructions, for example, instructions 416-420. In certain examples hardware process or 412 may perform these instructions dynamically.

Hardware processor 412 may execute instruction 416 to use a machine learning model to compute, for each network device of a group of network devices, firmware version scores for prospective update firmware versions. In various examples, the model parameters of the machine learning model may be tuned in accordance with the training described in conjunction with FIG. 3.

For an exemplary first network device of the group of network devices, a first prospective update firmware version may be a firmware version compatible on the first network device, that is not currently installed on the first network device. Likewise, for a second network device of the group of network devices, the first prospective update firmware version may also be a firmware version compatible on the second network device, that is not currently installed on the second network device.

In certain examples, for the first network device, hardware processor 412 may compute firmware version scores for each prospective update firmware version (including the first prospective update firmware version) compatible on the first network device. Likewise, for the second network device, hardware processor 412 may compute firmware version scores for each prospective update firmware version (including the first prospective update firmware version) compatible on the second network device, and so on. If for example the first prospective firmware version is not compatible on a third network device of the network device cluster, for the third network device—hardware processor 412 may not compute a firmware version score for the first prospective firmware version, or hardware processor 412 may compute a third firmware version score that is a null score (e.g., zero score).

An exemplary first firmware version score computed for the combination of the first network device and the first prospective update firmware version may comprise a first firmware update likelihood score, the first firmware update likelihood score comprising a numerical score (which may be a positive or negative number) quantifying a likelihood that the first network device will update from a first pre-update firmware version installed on the first network device to the first prospective update firmware version. However in other examples the first firmware version score may be other types of numerical scores that quantify a level of value (e.g., a customer-specific level of value) for firmware versions.

Here the group of network devices may be various types of groups. For instance, the group of network devices may be all the network devices of a customer, or all the network devices of a customer of a particular type (e.g., all the access points of the customer). In certain examples, the group of network devices may comprise network devices of multiple networks (e.g., gateways across multiple networks of a customer).

In some examples, the group of network devices may comprise a network device cluster of a customer. In examples where the group of network devices comprise a network device cluster, hardware processor 412 can identify the group of network devices as a network device cluster prior to executing instructions 416. For example, individual access points may identify a local access point to be a virtual controller. Hardware processor 412 may identify the access points that nominate the same virtual controller as a single network device cluster that must all be compatible with each other. For mixed-type groups of network devices, hardware processor 412 can use several approaches to identify network topology. For example, hardware processor 412 can use LLDP (Link Layer Discovery Protocol) to identify Aruba APs connected to Aruba Switches.

As described above, a network device cluster may be a group/cluster of network devices of the same type (e.g., access points, switches, gateways, etc.) that operate together within a common network. For example, the group of network devices may comprise a cluster of access points that work together to provide wireless access to users at a customer location. While these access points (of a common network device cluster) may have a common vendor, they may be different models, with different sets of compatible firmware versions available to them. As alluded to above, network device clusters should utilize the same firmware version in order to maintain optimal interoperability/compatibility. Unfortunately, a problem with the conventional manual firmware version recommendation process is that it frequently recommends 'incompatible' firmware versions for network device clusters. For example, the process may recommend a firmware version that is only compatible on certain devices within the cluster. Accordingly, if a customer follows the recommendation, certain of their network devices may be installed with incompatible firmware. Alternatively, a customer may follow the recommendation for a subset of network devices within the cluster for which the recommended firmware version is compatible, resulting in network devices of the cluster having different firmware versions. Either of these scenarios is sub-optimal for network operation/health, and can lead to: (a) a poor customer/user experience, (b) high troubleshooting costs incurred by a vendor; (c) and reduced performance for a vendor's network management system that relies on customer network devices running on compatible firmware version in order to provide optimal services. As alluded to above, and as will be described below, examples can improve upon the current firmware recommendation process by making network device cluster-specific recommendations that ensure that a recommended firmware version is compatible on all network devices of a network device cluster.

In certain examples the machine learning model may compute the exemplary first firmware version score for the combination of the first network device and the first prospective update firmware version based on features of the first firmware version and features of the first "pre-update" firmware version currently installed on the first network device. Features of the first pre-update firmware version may comprise: (1) a number of bugs raised by customers, weighted by severity of bugs, for the first pre-update firmware version; (2) a number of internal bugs, weighted by severity of bugs, for the first pre-update firmware version; (3) age of the first pre-update firmware version; (4) a value measuring a level of popularity for the first pre-update firmware version; (5) a numerical value measuring a level of security for the first pre-update firmware version; (6) a numerical value measuring a level of operational performance (e.g., SLA, device uptime, crashes, speed, etc.) for the first pre-update firmware version; etc. Relatedly, the features of the first prospective update firmware version may comprise: (1) a number of bugs raised by customers, weighted by severity of bugs, for the first prospective update firmware version; (2) a number of internal bugs, weighted by severity of bugs, for the first prospective update firmware version; (3) age of the first prospective update firmware version; (4) a value measuring a level of popularity for the first prospective update firmware version; (5) a numerical value measuring a level of security for the first prospective update firmware version; (6) a numerical value measuring a level of operational performance (e.g., SLA, device uptime, crashes, speed, etc.) for the first prospective update firmware version; etc.

As alluded to above, in various examples the machine learning model may take customer-specific factors into account when computing firmware version scores for the first network device such as: (a) size of the customer site the first network device is deployed in; (b) customer-specific deployment configurations; (c) customer-specific network device configurations (c) customer-specific vulnerability concerns; (d) customer-specific bugs; etc. In this way, hardware processor 412 can provide firmware version update recommendations that are tailored to individual customers/customer sites.

Hardware processor 412 may execute instruction 418 to compute, for at least one (and in some cases each) prospective update firmware version, an aggregate firmware version score across the group of network devices. In certain examples, an aggregate firmware version score for the first prospective update firmware version may a comprise a sum of all computed firmware version scores (including the exemplary first firmware version score) for the first prospective update firmware version. In other examples, the aggregate firmware version score for the first prospective update firmware version may comprise an average of all computed firmware version scores for the first prospective update firmware version. Here by basing its recommendation on an aggregate firmware version score (as opposed to a single firmware version score from a single network device), hardware processor 412 can improve its recommendation for the group of network devices by recommending the prospective update firmware version that is optimal for the greatest number of network devices.

As alluded to above, in certain cases if a prospective update firmware version is only compatible on a subset of the network devices of the network device cluster—firmware versions scores for the prospective update firmware version may only be computed for the subset of network devices on which the prospective firmware update version is compatible. Accordingly, the aggregate firmware score for the prospective firmware version across the network device cluster may be an aggregate firmware score based on the computed firmware versions scores for this subset of network devices. In other cases, if a prospective update firmware version is only compatible on a subset of the network devices of the network device cluster—null/zero scores may be computed for the prospective firmware update version for the network devices on which the prospective firmware update version is incompatible. In these cases, hardware processor 412 may take these null/zero scores into account when computing the aggregate firmware score for the prospective firmware version across the network device cluster.

Hardware processor 412 may execute instruction 420 to recommend, for the group of network devices, the prospective update firmware version having the highest aggregate firmware version score among compatible prospective update firmware versions (as used herein "compatible prospective update firmware versions" may refer to prospective update firmware versions compatible on all the network devices of the group of network devices). As described above, the group of network devices may comprise a network device cluster of a customer. Accordingly, by recommending a prospective update firmware version that is compatible on all the network devices of the group of network devices/network device cluster, hardware processor 412 can reduce the occurrence of incompatible-firmware network devices—thereby improving customer/user experience, reducing vendor-support costs, improving performance for a vendor's network management system, etc.

In various examples, prior to making the recommendation of instruction 420, hardware processor 412 can identify, as insecure, one or more of the compatible prospective update firmware versions (e.g., hardware processor 412 can measure a level of security for a prospective update firmware version according to a numerical score, and all prospective update firmware versions which do not meet a "security threshold" may be identified as insecure). In these examples, hardware processor 412 may execute instruction 420 to recommend, for the group of network devices, the compatible prospective update firmware version having the highest aggregate firmware version score among compatible prospective update firmware versions, that has not been identified as insecure.

In various examples, hardware processor 412 may provide its recommendation to at least one of the network devices of the group of network devices. In certain examples hardware processor 412 may provide its recommendations to a network/system administrator.

As alluded to above, in certain examples hardware processor 412 may be incorporated into a vendor's network management system (e.g., HPE's Aruba Central). In these examples, hardware processor 412 may also automatically update at least one of the network devices of the group of network devices to the recommended compatible prospective update firmware version. For instance, pursuant to a vendor's agreement with a particular customer, hardware processor 412 may push recommended updates to a customer's network devices on a regular schedule (e.g., monthly, quarterly, etc.).

In certain examples, hardware processor 412 may receive user feedback based on its recommendations (to e.g., network administrators). Such user feedback may be taken into account for future recommendations and/or during machine model training.

Figure 5:
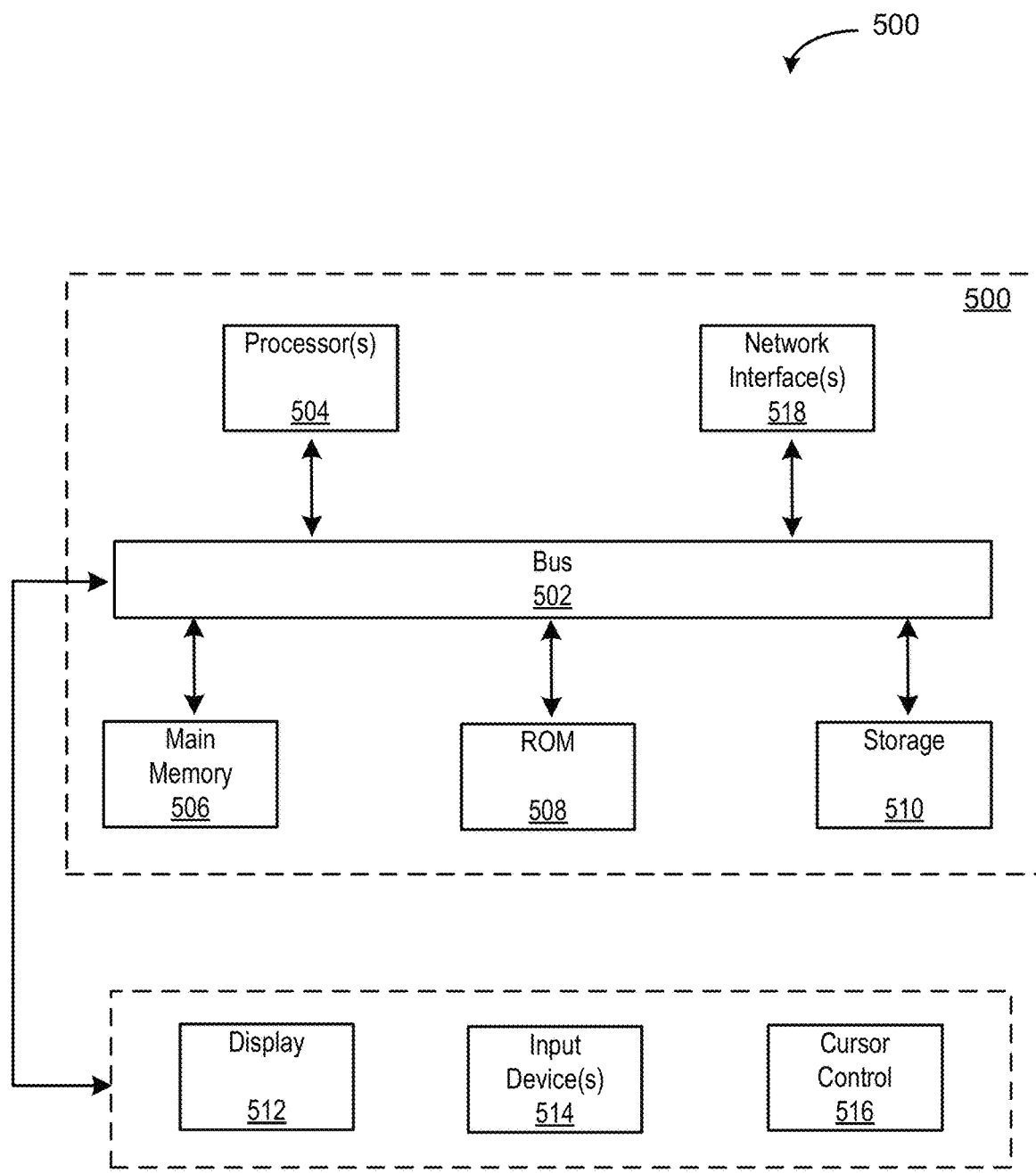
FIG. 5 depicts a block diagram of an example computer system in which various of the examples described herein may be implemented.

FIG. 5 depicts a block diagram of an example computer system 500 in which various of the embodiments described herein may be implemented. The computer system 500 includes a bus 512 or other communication mechanism for communicating information, one or more hardware processors 504 coupled with bus 512 for processing information. Hardware processor(s) 504 may be, for example, one or more general purpose microprocessors.

The computer system 500 also includes a main memory 506, such as a random access memory (RAM), cache and/or other dynamic storage devices, coupled to bus 512 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 512 for storing static information and instructions for processor 504. A storage device 510, such as a magnetic disk, optical disk, or USB thumb drive (Flash drive), etc., is provided and coupled to bus 512 for storing information and instructions.

The computer system 500 may be coupled via bus 512 to a display 512, such as a liquid crystal display (LCD) (or touch screen), for displaying information to a computer user. An input device 514, including alphanumeric and other keys, is coupled to bus 512 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 512. Transmission media can also take the form of acoustic or light waves, such as those generated during radio-wave and infra-red data communications.

The computer system 500 also includes a communication interface 518 coupled to bus 512. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Data systems, platforms, and frameworks can apply machine learning (ML) or other models or algorithms (referred to herein as "ML models") on data inputs to generate various analytics. Often, these ML models may be trained to generate outputs based on inputs received during operation (i.e. when the ML model is placed in a production/inference environment). Training of ML models may involve providing ML models with known training data which produce known outputs. Such training can teach the ML models what outputs to predict based on particular inputs. For ML models to have accurate performance, training data and operational data (i.e. real-world data) may share various features used to predict corresponding outputs.

As used herein, "one or more processing resources" for a network management system may refer to any number of physical processors on any number of devices.

What is claimed is:

1. A network management system comprising:
one or more processing resources; and
a non-transitory computer-readable medium, coupled to the one or more processing resources, having stored therein instructions that when executed by the processing resources cause the system to perform a method comprising:
receiving a machine learning model that is trained, during a training stage, by:
receiving historical firmware update dataset comprising a firmware version with features of a first network device cluster and an acceptance of a customer associated with the firmware version for the first network device cluster,
updating model parameters based on the firmware version, the features of the first network device cluster, and the acceptance of the customer for implementing the firmware version at the first network device cluster, and
enabling generation, during an inference stage, of a likelihood of acceptance score based on the model parameters generated during training;
identifying a second network device cluster, wherein the second network device cluster comprises network devices of a same type associated with the customer for which the machine learning model is trained;
during an inference stage, using the machine learning model to compute, for network devices of the second network device cluster, multiple firmware version scores for multiple prospective update firmware versions, the multiple firmware version scores being based on:
features of pre-update firmware versions installed on the network devices of the second network device cluster,
features of the prospective update firmware versions, and
site-specific factors where the second network device cluster is deployed;
computing, for at least one of the multiple prospective update firmware versions, an aggregate firmware version score across the second network device cluster; and
recommending, for the second network device cluster, an update to the at least one of the multiple prospective update firmware versions having a highest aggregate firmware version score among compatible prospective update firmware versions.

2. The network management system of claim 1, wherein computing, for network devices of the second network device cluster, the multiple firmware version scores for the multiple prospective update firmware versions comprises:
for a first network device of the second network device cluster, computing a first firmware version score for a first prospective update firmware version based on features of a first pre-update firmware version installed on the first network device and features of the first prospective update firmware version; and
for a second network device of the second network device cluster, computing a second firmware version score for the first prospective update firmware version based on features of a second pre-update firmware version installed on second network device and features of the first prospective update firmware version, and
wherein the first firmware version score computed for the first prospective update firmware version comprises a first firmware update likelihood score, the first firmware update likelihood score comprising a numerical score quantifying a likelihood that the first network device will update from the first pre-update firmware version to the first prospective update firmware version.

3. The network management system of claim 1, wherein computing, for network devices of the second network device cluster, the multiple firmware version scores for the multiple prospective update firmware versions comprises:
for a first network device of the second network device cluster, computing a first firmware version score for a first prospective update firmware version based on features of a first pre-update firmware version installed on the first network device and features of the first prospective update firmware version; and
for a second network device of the second network device cluster, computing a second firmware version score for the first prospective update firmware version based on features of a second pre-update firmware version installed on second network device and features of the first prospective update firmware version, and
wherein computing, for at least one prospective update firmware version, an aggregate firmware version score across the second network device cluster comprises:
computing an aggregate firmware version score for the first prospective update firmware version based on the first firmware version score and the second firmware version score.

4. The network management system of claim 1, wherein:
the method further comprises identifying one or more compatible prospective update firmware versions as insecure; and
recommending, for the second network device cluster, the update to the multiple prospective update firmware versions having the highest aggregate firmware version score among compatible prospective update firmware versions comprises recommending the multiple prospective update firmware versions having the highest aggregate firmware version score among compatible prospective update firmware versions, that has not been identified as insecure.

5. The network management system of claim 1, wherein the method further comprises:
updating at least one network device of the second network device cluster in accordance with the recommendation.

6. The network management system of claim 1, wherein recommending the update to the at least one of the multiple prospective update firmware versions is not a latest firmware version.

7. The network management system of claim 1, wherein recommending the update to the at least one of the multiple prospective update firmware versions is not a first optimal firmware version for a network device in the first network device cluster and is a second optimal firmware version for the first network device cluster as a whole.

8. The network management system of claim 1, wherein the multiple firmware version scores comprise a numerical score quantifying a likelihood that a network device in the first network device cluster will update from a first pre-update firmware version installed on the network device to a first prospective update firmware version.

9. The network management system of claim 1, wherein the processing resources further cause the system to perform the method comprising:
adjusting the multiple firmware version scores based on one or more of (a) size of a customer site where the first network device is deployed; (b) customer-specific deployment configurations; (c) customer-specific network device configurations; (c) customer-specific vulnerability concerns; and (d) customer-specific bugs.

10. A non-transitory computer-readable medium storing instructions, which when executed by one or more processing resources, cause the one or more processing resources to:
receive a machine learning model that is trained, during a training stage, by:
receiving historical firmware update dataset comprising a firmware version with features of a first network device cluster and an acceptance of a customer associated with the firmware version for the first network device cluster;
updating model parameters based on the firmware version, the features of the first network device cluster, and the acceptance of the customer for implementing the firmware version at the first network device cluster; and
enabling generation, during an inference stage, of a likelihood of acceptance score based on the model parameters generated during training;
identify a second network device cluster, wherein the second network device cluster comprises network devices of a same type associated with the customer for which the machine learning model is trained;
during an inference stage, use the machine learning model to compute, for each network device of the second network device cluster, multiple firmware upgrade likelihood scores for multiple upgrade firmware versions, the multiple firmware version scores being based on;
(a) features of pre-upgrade firmware versions installed on the network devices of the second network device cluster,
(b) features of the upgrade firmware versions, and
(c) site-specific factors where the second network device cluster is deployed;
compute, for at least one of the multiple upgrade firmware versions, an aggregate firmware version upgrade likelihood score across the second network device cluster; and
recommend, for the second network device cluster, an upgrade to the at least one of the multiple upgrade firmware versions having the highest aggregate firmware upgrade likelihood score among compatible upgrade firmware versions.

11. The non-transitory computer-readable medium storing instructions of claim 10, wherein for a first network device of the second network device cluster the machine learning model computes the multiple firmware upgrade likelihood scores for the multiple upgrade firmware versions compatible with the first network device based on a first pre-upgrade firmware version installed on the first network device and features of the multiple upgrade firmware versions compatible with the first network device.

12. The non-transitory computer-readable medium storing instructions of claim 11, wherein a first firmware upgrade likelihood score comprises a numerical score quantifying a likelihood that the first network device of the second network device cluster will upgrade from the first pre-upgrade firmware version to a first upgrade firmware version.

13. The non-transitory computer-readable medium storing instructions of claim 12, wherein the first firmware upgrade likelihood score comprises a probability that the first network device of the second network device cluster will upgrade from the first pre-upgrade firmware version to the first upgrade firmware version.

14. The non-transitory computer-readable medium storing instructions of claim 13, wherein the aggregate firmware upgrade likelihood score across the second network device cluster for the first upgrade firmware version comprises an average firmware upgrade probability for the first upgrade firmware version across the second network device cluster.

15. The non-transitory computer-readable medium storing instructions of claim 11, wherein the features for the first pre-upgrade firmware version installed on the first network device comprise at least one of:
a number of bugs raised by customers, weighted by severity of bugs, for the first pre-upgrade firmware version;
a number of internal bugs, weighted by severity of bugs, for the first pre-upgrade firmware version;
age of the first pre-upgrade firmware version;
a numerical value measuring a level of popularity for the first pre-upgrade firmware version; and
a numerical value measuring a level of security for the first pre-upgrade firmware version.

16. A method comprising:
generating a historical firmware update dataset related to a first network device cluster, the historical firmware update dataset comprising a firmware version with features of the first network device cluster and an acceptance of a customer associated with the firmware version for the first network device cluster;
during a training stage, using the historical firmware update dataset to train a machine learning model, the training stage implemented by:
updating model parameters based on the firmware version, the features of the first network device cluster, and the acceptance of the customer for implementing the firmware version at the first network device cluster, and
enabling generation, during an inference stage, of a likelihood of acceptance score based on the model parameters generated during training;
during the inference stage, enabling the machine learning model to compute the firmware update scores for multiple prospective update firmware versions on a second network device, the firmware update scores being based on:
(a) features of a pre-update firmware version installed on the second network device, (b) features of one or more contemporaneously available update firmware versions compatible on the second network device, and (c) site-specific factors where a second network device cluster associated with the second network device is deployed.

17. The method of claim 16, wherein a first firmware update score for the historical firmware update made on the second network device comprises a numerical score quantifying a likelihood that the second network device will update from the pre-update firmware version to a first contemporaneously available update firmware version.

18. The method of claim 16, wherein the method further comprises:

refining the machine learning model based on comparisons between the machine learning model's predicted accepted firmware updates and the historical firmware updates.

19. The method of claim 16, wherein the first network device cluster comprise network devices of the same type across a plurality of customer network deployments.

20. The method of claim 16, wherein the machine learning model comprises a random forest model.

* * * * *